(12) United States Patent
Messmer et al.

(10) Patent No.: US 7,934,202 B2
(45) Date of Patent: Apr. 26, 2011

(54) ACTIVE EXECUTION TRACING

(75) Inventors: William R. Messmer, Woodinville, WA (US); Thomas S. Coon, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1212 days.

(21) Appl. No.: 11/118,280

(22) Filed: Apr. 28, 2005

(65) Prior Publication Data
US 2006/0248514 A1    Nov. 2, 2006

(51) Int. Cl.
  *G06F 9/44* (2006.01)
  *G06F 9/445* (2006.01)

(52) U.S. Cl. ............ 717/131; 717/128; 710/52; 710/56; 710/57; 710/58; 710/59; 711/100; 711/156

(58) Field of Classification Search .................... 717/128
See application file for complete search history.

(56) References Cited

U.S. PATENT DOCUMENTS

| | | | |
|---|---|---|---|
| 4,358,848 A * | 11/1982 | Patel | 714/761 |
| 5,442,740 A | 8/1995 | Parikh | |
| 5,781,910 A * | 7/1998 | Gostanian et al. | 707/201 |
| 6,145,100 A * | 11/2000 | Madduri | 714/45 |
| 6,282,701 B1 * | 8/2001 | Wygodny et al. | 717/125 |
| 6,353,924 B1 * | 3/2002 | Ayers et al. | 717/128 |
| 6,584,586 B1 * | 6/2003 | McCoy | 714/45 |
| 6,658,416 B1 | 12/2003 | Hussain et al. | |
| 6,728,955 B1 * | 4/2004 | Berry et al. | 717/158 |
| 6,775,826 B1 | 8/2004 | Zahavi et al. | |
| 7,213,113 B2 | 5/2007 | Sahin et al. | |
| 7,240,334 B1 | 7/2007 | Fluke et al. | |
| 7,260,692 B1 | 8/2007 | Zahavi et al. | |
| 7,278,057 B2 * | 10/2007 | Betancourt et al. | 714/38 |
| 7,447,947 B2 | 11/2008 | Walker | |
| 2002/0199172 A1 * | 12/2002 | Bunnell | 717/128 |
| 2005/0102673 A1 * | 5/2005 | DeWitt et al. | 718/100 |
| 2005/0210454 A1 * | 9/2005 | DeWitt et al. | 717/133 |
| 2006/0248512 A1 * | 11/2006 | Messmer et al. | 717/125 |

* cited by examiner

*Primary Examiner* — Jason Mitchell
*Assistant Examiner* — Chris Nelson (57) ABSTRACT

Visualization for active execution tracing pertains to one or more tools used to capture and analyze events leading to a point-of-failure during execution of a function or at least a portion of an application, program, process, or other assemblage of programmable and executable code.

16 Claims, 6 Drawing Sheets

ACTIVE EXECUTION TRACING

DESCRIPTION OF THE DRAWINGS

Active execution tracing and visualization thereof are described herein with reference to the following figures.

DETAILED DESCRIPTION

Active execution tracing and visualization thereof are described herein. More particularly, the description herein pertains to tools, services, and corresponding interfaces used to capture, analyze, and interact with events leading to a point-of-failure during execution of a function or some other portion of an application, program, process, or other assemblage of programmable and executable code.

Figure 1:
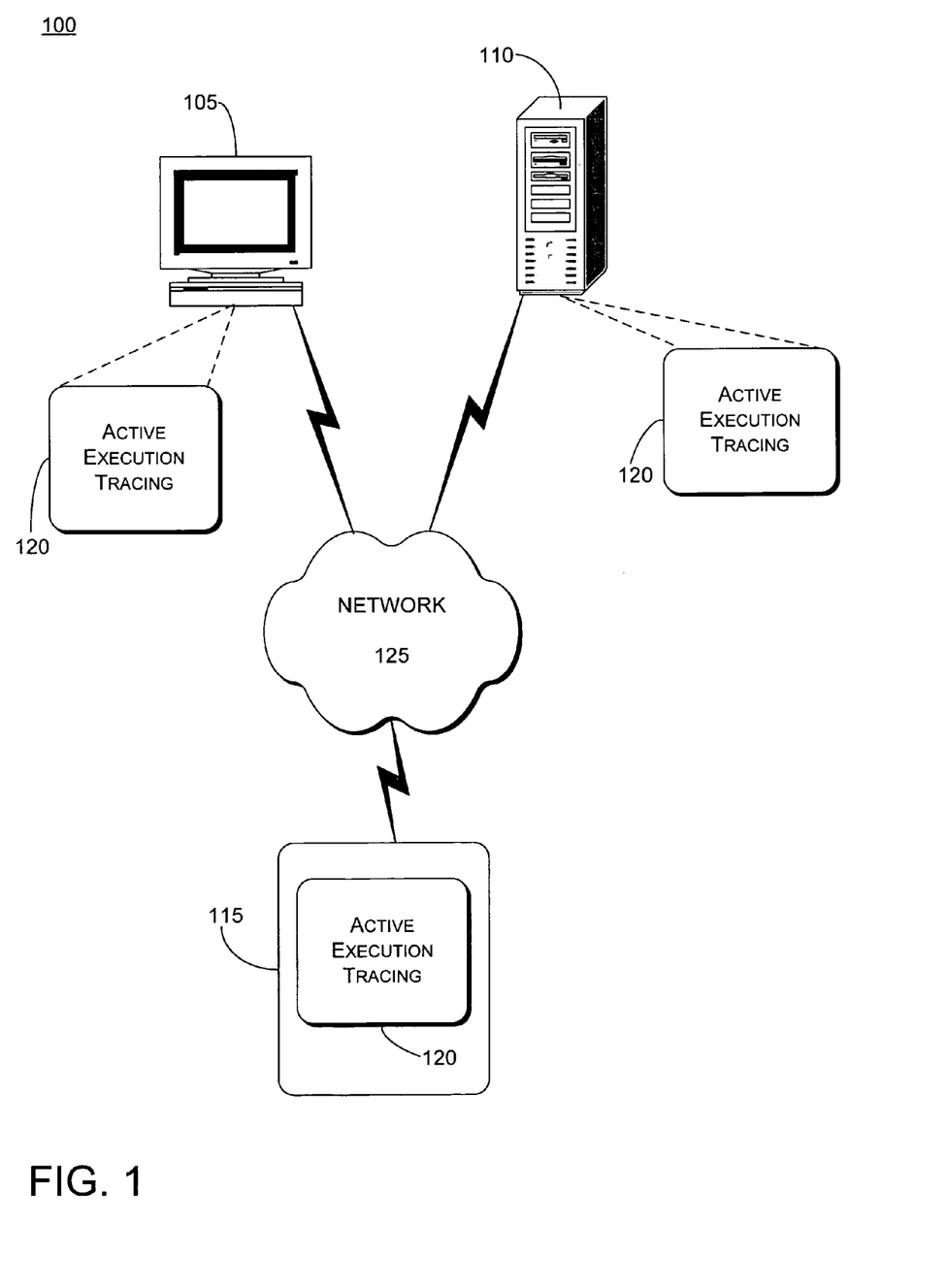
FIG. 1 shows devices communicating over a network, with the devices implementing example technologies for active execution tracing and visualization thereof.

FIG. 1 shows example network environment 100 in which active execution tracing and visualization thereof may be implemented. However, implementation of active execution tracing and visualization thereof, according to at least one example, is not limited to network environments. Regardless, in FIG. 1, client device 105, server device 110, and "other" device 115 may be communicatively coupled to one another via network 125; and, further, at least one of client device 105, server device 110, and "other" device 115 may be capable of implementing active execution tracing and visualization thereof 120, as described herein.

Client device 105 may be at least one of a variety of conventional computing devices, including a desktop personal computer (PC), workstation, mainframe computer, Internet appliance, set-top box, and gaming console. Further, client device 105 may be at least one of any device that is capable of being associated with network 125 by a wired and/or wireless link, including a personal digital assistant (PDA), laptop computer, cellular telephone, etc. Further still, client device 105 may represent the client devices described above in various quantities and/or combinations thereof. "Other" device 115 may also be embodied by any of the above examples of client device 105.

Server device 110 may provide any of a variety of data and/or functionality to client device 105 or "other" device 115 in accordance with at least one implementation of active execution tracing and visualization thereof 120. The data may be publicly available or alternatively restricted, e.g., restricted to only certain users or only if an appropriate subscription or licensing fee is paid. Server device 110 may be at least one of a network server, an application server, a web blade server, or any combination thereof. Typically, server device 110 is any device that may be a content source, and client device 105 is any device that may receive such content either via network 125 or in an off-line manner. However, according to the example implementations described herein, client device 105 and server device 110 may interchangeably be a sending node or a receiving node in network environment 100. "Other" device 115 may also be embodied by any of the above examples of server device 110.

"Other" device 115 may be any further device that is capable of implementing active execution tracing and visualization thereof 120 according to one or more of the examples described herein. That is, "other" device 115 may be any software-enabled computing or processing device that is capable of implementing active execution tracing, and provide visualization thereof, for at least a function, process, or any other portion of an application, program, or other assemblage of programmable and executable code in any one of an operating system, a managed execution environment, and a testing environment. Thus, "other" device 115 may be a computing or processing device having at least one of an operating system, an interpreter, converter, compiler, or runtime execution environment implemented thereon. These examples are not intended to be limiting in any way, and therefore should not be construed in that manner.

Network 125 may represent any of a variety of conventional network topologies and types, which may include wired and/or wireless networks. Network 102 may further utilize any of a variety of conventional network protocols, including public and/or proprietary protocols. Network 125 may include, for example, the Internet as well at least portions of one or more local area networks (also referred to, individually, as a "LAN"), such as 802.11 system; a personal area network (i.e., PAN), such as Bluetooth.

Figure 2:
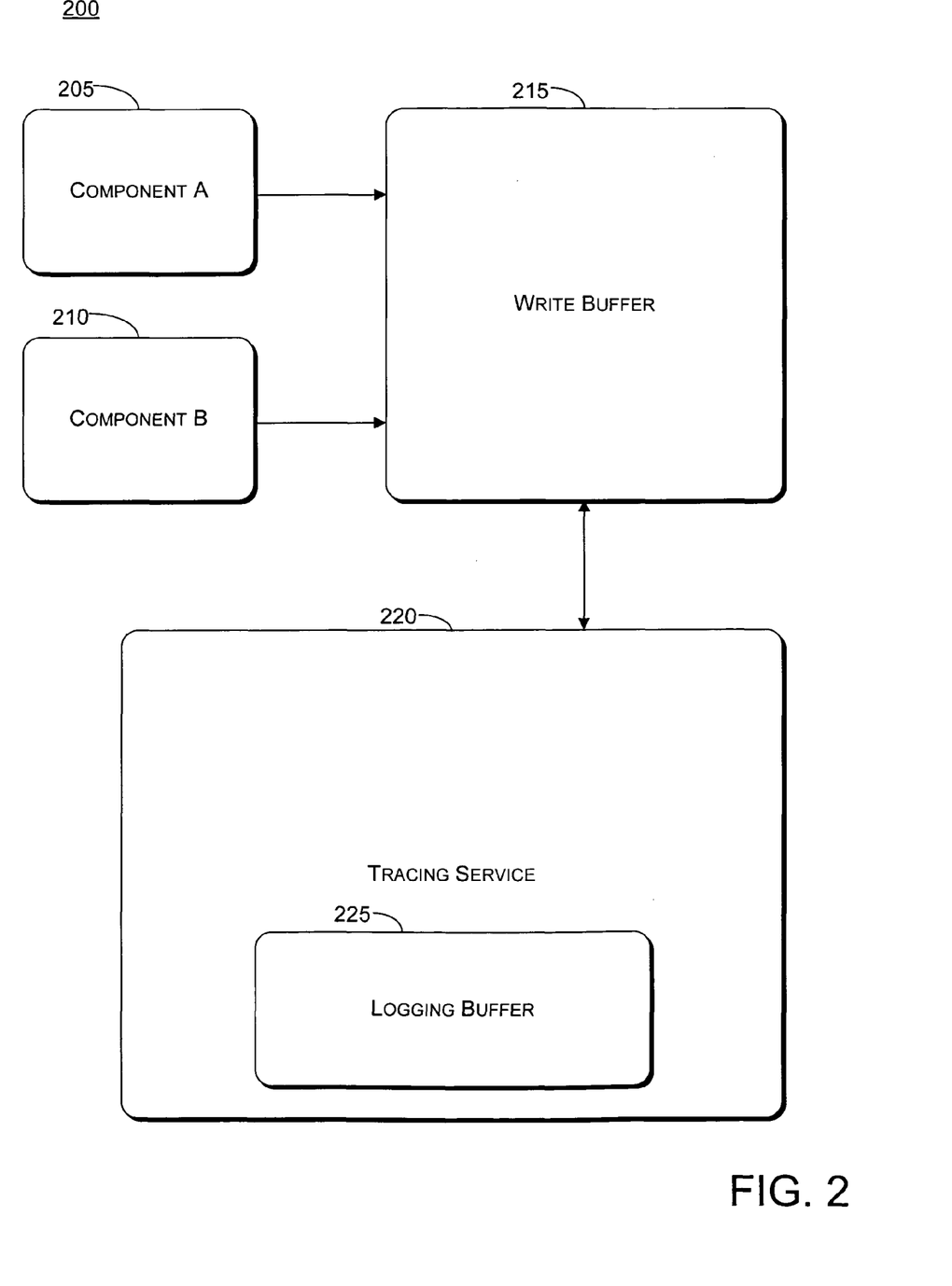
FIG. 2 shows an example of system components utilized to implement example technologies for active execution tracing and visualization thereof.

FIG. 2 shows system 200 having components utilized to implement at least one example of active execution tracing.

Component A 205 and component B 210 may represent a function, process, or any other portion of an application, program, or other assemblage of programmable and executable code that may receive an instruction to enter into execution and a subsequent instruction to exit from execution.

Write buffer 215 may represent a buffer to write data associated with at least one of component A 205 and component B 210 into a tracing service. When data is first written to write buffer 215 from at least one of component A 205 and component B 210, active execution tracing may be initialized. Upon such occurrence, write buffer 215 may interface with tracing service 220 to receive a pointer to logging buffer 225.

The data written into write buffer 215 from at least one of component A 205 and component B 210 may include an instruction, or at least a data representation thereof, for a respective one of the components to enter into execution; at least one frame of a stack trace including, e.g., data indicating the source of an instruction to enter into execution (i.e., a return address); an actual instruction (e.g., callback method) passed to the respective component; the time that an instruction is passed to the respective component; the name of the respective component, etc.; and an instruction for the respective component to exit from execution. A stack trace may refer to a sequence of frames on a call stack, which may refer to a reserved amount of memory that tracks a sequence of methods called in an application or program, for a respective one of component A 205 and component B 210. More particularly, a stack trace may refer to a reserved amount of memory that tracks a sequence of functions, methods, or other portions of executable code called in an application or program. Each frame of a call stack may refer to at least one of a function, method, routine, instruction pointer, and register value that have been pushed on the call stack.

Alternative implementations may contemplate write buffer 215 further referring or pointing to source code, or at least data related to the source code, from at least one of component A 205 and component B 210. The source code, or data related thereto, may provide a more in-depth view of a, e.g., stack trace that is detected by or stored to tracing service 220. The data related to the source code may include, e.g., an entered function, a module to which the entered function corresponds, etc. Even further alternative implementations may then connect such data to source code for analysis.

Accordingly, at least one example implementation of active execution tracing 120 may track modules, including DLLs (dynamic link libraries) and EXEs (executable files), as well as signatures used in an application or program to which either of component A 205 and component B 210 correspond. Such tracking may occur in parallel with at least one of a call to enter execution and a call to exit execution for a corresponding function.

Write buffer 215, after initialization of tracing service 200, may write the data (i.e., stack trace, etc.) from the respective one of component A 205 and component B 210 into logging buffer 225 corresponding to tracing service 220.

Tracing service 220 may refer to a service that is utilized to capture and analyze events leading to a point-of-failure during execution of a function, process, or other portion of an application, program, process, or other assemblage of programmable and executable code.

Tracing service 220 may be a stand-alone service or, alternatively, may be associated with a debugger or other testing tool. Further, tracing service 200 may be disposed within any one of an operating system, a managed execution environment, and a testing environment. Even further, at least one alternative implementation of tracing service 220 may incorporate write buffer 215 therein.

Logging buffer 225 may refer to a buffer disposed within, or otherwise associated with, tracing service 220.

Logging buffer 225 may be a rewriteable buffer having fields (i.e., entries) that may be overwritten in predetermined cycles of time dependent upon predetermined conditions. For example, a respective field within logging buffer 225 may be overwritten with newly received data from either of component A 205 and component B 210 if the respective field has stored therein at least the instruction for the corresponding component to enter into execution and the instruction for the component to exit from execution. By this example implementation, a stack trace and other data pertaining to a particular one of component A 205 and component B 210 may be retained, and therefore traced, until the respective component has exited from execution. The length of the overwriting cycles and the conditions under which fields of logging buffer 225 may be overwritten may vary from one implementation to another, and therefore the example provided above should not be considered to be limiting in any manner. That is, alternative implementations of active execution tracing 120 may contemplate logging buffer 225 as being expandable, and therefore the aforementioned overwriting may be rendered moot.

Further still, according to at least one implementation of active execution tracing 120, at least portions of data buffered within logging buffer 225 may be committed to one or more persistent storages, which may be a local storage or located on at least one other of devices 105, 110, and 115 on network 125 (see FIG. 1). The commitment of at least portions of logging buffer 225 to a more persistent storage may be implemented upon occurrence of an event with regard to the application or program to which component that writes data to logging buffer 225 correspond. For example, when write buffer 215 writes data from component A 205 into logging buffer 225 and a crash occurs during execution of an application or program to which component A 205 corresponds, at least portions of logging buffer 225 containing data related to component A 205 may be committed to a persistent storage. The data on the one or more persistent storages may then be studied and analyzed for various purposes. Alternative events that may cause or otherwise initiate at least portions of logging buffer 225 to be committed to one or more persistent storages include a user command or automated query made to determine the processing status of a particular component or even the application or program to which the particular component corresponds. Such user queries to tracing service 220 may be made via a user interface, examples of which are described further below.

Alternative implementations of tracing service 220 may contemplate logging buffer 225 being provided as part of a "per-process" or "per-application/program" basis, either incorporated as part of tracing service 220 or separate from the service. Regardless, in such alternative implementations, logging buffer 225 may receive stack traces and other data from components corresponding to individual applications or programs, and be linked to other such implementations of logging buffer 225 corresponding to other individual applications or programs to provide a more comprehensive view of processing of related applications or programs upon an occurrence of one of the aforementioned events.

As stated above, the data on the one or more persistent storages may then be studied and analyzed for various purposes. For example, if a crash occurs within an application to which one of the aforementioned components, processes, or programs correspond, the data committed to the persistent storage may be transmitted to, or otherwise accessed by, a programming source or proprietor of the application for analysis of the cause of the crash. That is, the data committed to the persistent storage may prove to be helpful in a crash analysis and, consequently, the improvement of the execution of corresponding code.

Figure 3:
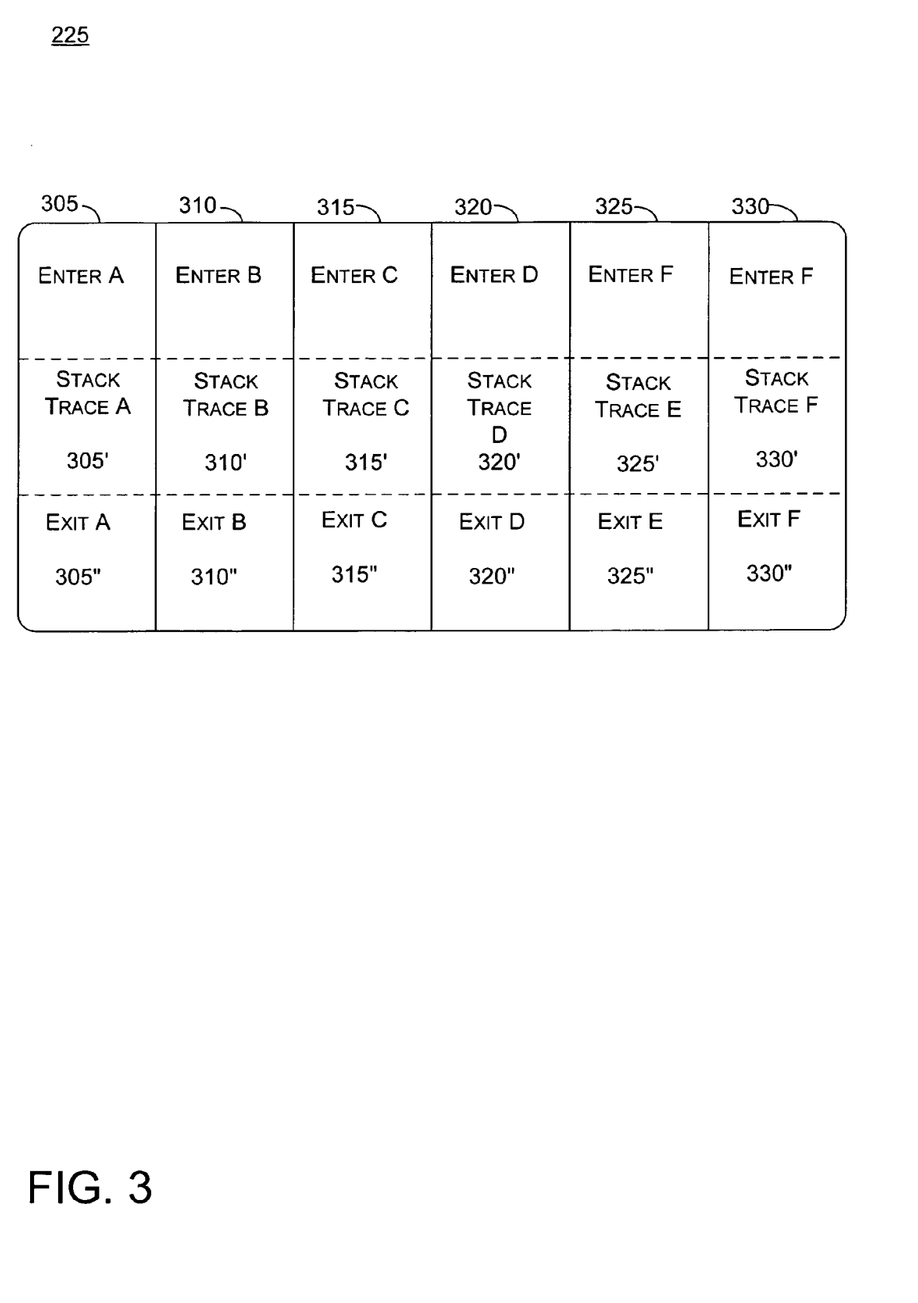
FIG. 3 shows a more detailed implementation of an example component described from FIG. 2.

FIG. 3 shows an example of a detailed implementation of logging buffer 225 shown in FIG. 2. The components within logging buffer 225 are buffered chronologically. However, the display of such components, and related data, may be ordered in a customized manner (i.e., according to either time or component or function), as desired for analysis.

According to one example implementation of logging buffer 225, columns 305, 310, 315, 320, 325, and 330 may represent consecutive time increments during the processing of an application or program having components A, B, C, D, E, and F. In that case, the respective columns 305, 310, 315, 320, 325, and 330 may contain at least one of: an instruction for the respective one of components A, B, C, D, E, and F to enter into execution; at least one of a stack trace (e.g., 305', 310', 315', 320', 325', and 330') as well as a return address, a callback method, the time that the instruction to enter into execution is passed to the respective component, the name of the respective component, function arguments, etc.; and an instruction (e.g., 305", 310", 315", 320", 325", and 330") to exit from execution.

As alluded to above, logging buffer 225 may further point to source code, or data related thereto, from at least one component written therein. Therefore the respective sub-fields within the example of FIG. 3 may provide a pointer, link, or even annotation of such source code via a user interface.

Another example implementation of logging buffer 225 may be organized by the chronological ordering of the respective instructions for the respective components A-F to enter into execution. Thus, each sub-field (e.g., 305', 310', 315', 320', 325', and 330'; and 305", 310", 315", 320", 325", and 330") may be individually time-stamped to indicate the time at which the corresponding data was written into logging buffer 225, particularly since the data within each sub-field may not be received in the same chronological order as the corresponding instruction to enter into execution.

Each column (alternatively referred to as buffer space, buffer entry, or buffer field), corresponding to a respective one of components A-F, may refer to one field of a call stack. Thus, each column of logging buffer 225 may include sub-fields to receive at least a combination of the instruction to enter into execution and the instruction to exit from execution. Accordingly, if a respective one of columns 305, 310, 315, 320, 325, and 330 of logging buffer 225 in FIG. 3 contains both an instruction to enter into execution and an instruction to exit from execution, it may be presumed that the corresponding function has completed execution and thus the respective column of logging buffer 225 may be overwritten for a subsequently called component.

Implementations to provide a visualization of logging buffer 225 may be organized primarily by component, rather than chronological time. For example, a visualization of components A-F may show the elements of a call stack buffered in logging buffer 225 based on order of dependency therebetween. The respective columns 305, 310, 315, 320, 325, and 330 may then have sub-fields to receive a combination of the instruction to enter into execution and the instruction to exit from execution, which are respectively time-stamped.

Regardless, the above descriptions of logging buffer 225 are provided as examples only and are not intended to be limiting in any manner.

Figure 4:
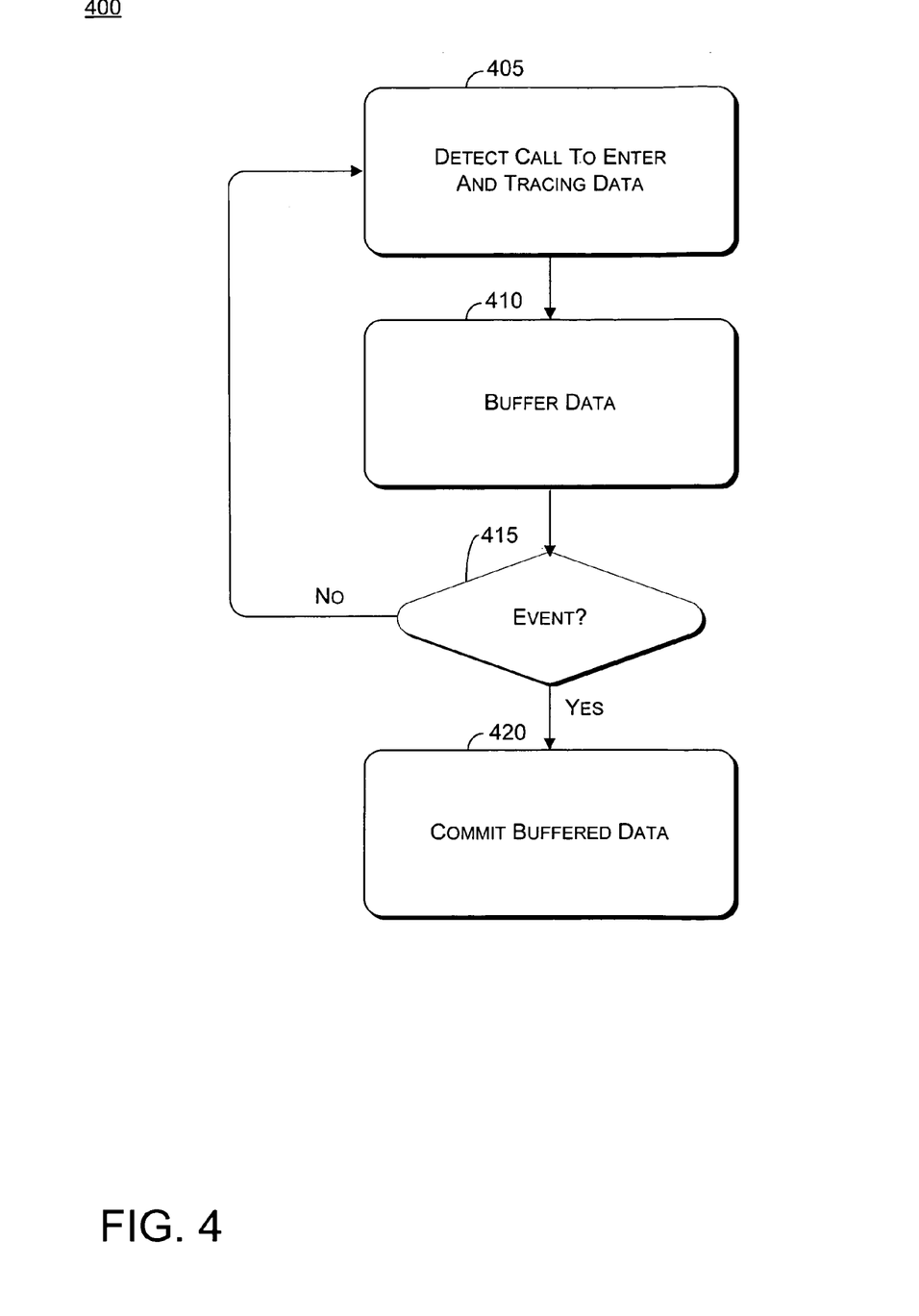
FIG. 4 shows an example processing flow in accordance with at least one implementation of active execution tracing and visualization thereof.

FIG. 4 shows example processing flow 400 for at least one implementation of active execution tracing 120 (see FIG. 1). Processing flow 400 is described below with references to features from FIGS. 1-3, particularly system 200 of FIG. 2, although such implementations are provided only as examples and are not intended to be construed in any limiting manner.

Block 405 may refer to write buffer 215, which may be external to or incorporated within tracing service 220, detecting a call (e.g., a function call) from at least one of component A 205 and component B 210 to enter into execution. Block 405 may further refer to write buffer 215 receiving from at least one of component A 205 and component B 210 a stack trace as well as other data from a respective one of the components including, e.g., a return address, a callback method, the time that an instruction is passed to the respective component, the name of the respective component, etc.; and writing the same to logging buffer 225.

If a call to enter into execution from either of component A 205 and component B 210 is detected by write buffer 215 for the first time, block 405 may further include a verification and initialization process. The verification may include write buffer 215, in conjunction with tracing service 220, verifying that the calling component is to be traced by tracing service 220. The initialization process may include write buffer 215 subsequently interfacing with tracing service 220 to receive at least a pointer to logging buffer 225, which may be associated with tracing service 220.

Block 410 may refer to logging buffer 225, which may be incorporated within tracing service 220 or external thereto, buffering data received from write buffer 215 in any manner described above with regard to FIG. 3. Such data may include the call to enter into execution for a respective one of component A 205 and component B 210, a stack trace or other data from a respective one of component A 205 and component B 210 including, e.g., a return address, a callback method, the time that an instruction is passed to the respective component, the name of the respective component, etc.

Decision 415 may refer to detection of an event that may determine whether at least portions of logging buffer 425 are to be committed to a persistent storage. Decision 420 may be made by write buffer 215 or, alternatively, another component associated with tracing service 220. Examples of an event detected during decision 420 may include a crash (i.e., abnormal end) of an application or program to which a respective one of component A 205 and component B 210 correspond, a user command, an automated query, or an implementation of a debugging process.

Subsequent to either of block 405 and block 410 or subsequent to negative decision 415, write buffer 215 may detect a call to exit execution from at least one of component A 205 and component B 210. The call to exit execution may typically be buffered in logging buffer 225. Alternative implementations of processing flow 400 may even forego buffering the detected call to exit execution. Regardless, having detected a call to exit execution for a respective one of component A 205 and component B 210, a field within logging buffer 225 that stores all detected and buffered data regarding the respective one of component A 205 and component B 210 may be overwritten in accordance with a corresponding buffering cycle.

Negative decision 415 may return processing flow 400 to block 405 for further tracing of called components.

Block 420 may refer to, subsequent to positive decision 415, at least portions of logging buffer 225 being committed to a persistent storage for purposes that may include, e.g., display, analysis, and study. The persistent storage may be local on a device upon which the corresponding application or program is or was running, the persistent storage may be network-based disposed on one or more devices, or the persistent storage may be an off-line storage medium such as a disk or chip.

According to at least one implementation of active execution tracing 120, subsequent to block 420, the data committed to the persistent storage may be utilized for, e.g., crash analysis. Such analysis may be made after a network-based transmission of the data to a programming source or proprietor of the application or program to which at least one of the buffered components correspond. Alternative, such analysis may be executed locally, upon the device which the corresponding application or program is or was running.

Figure 5:
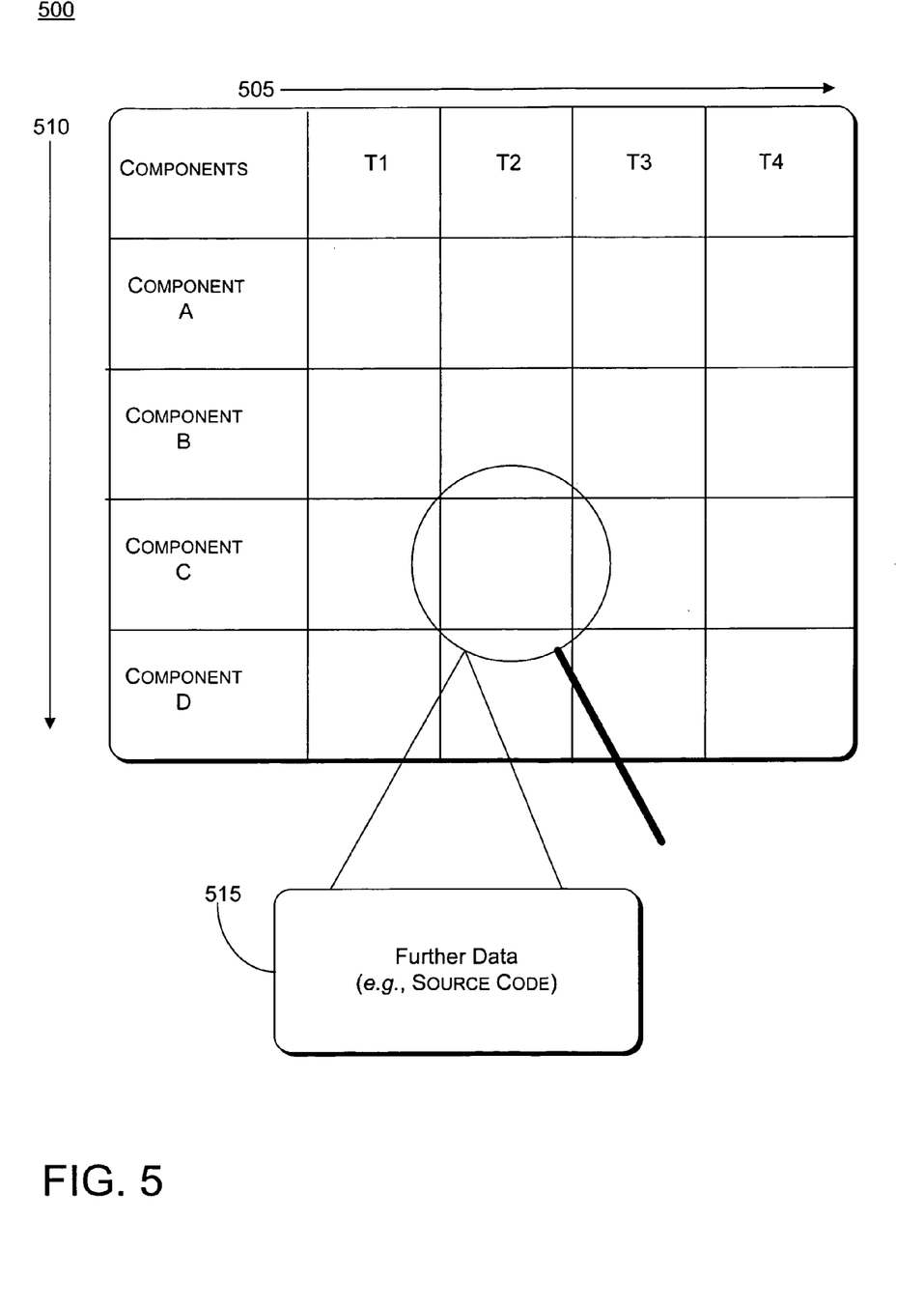
FIG. 5 shows an interface in accordance with an example implementation of active execution tracing visualization.

FIG. 5 shows example interface 500 that serves as an example implementation of active execution tracing visualization. Interface 500 is described below with references to features from FIGS. 1-4, particularly system 200 of FIG. 2, although such implementations are provided only as examples and are not intended to be limited in any manner.

According to at least one example implementation of active execution tracing visualization, interface 500 may include a series of data fields in which data stored in one or more stand-alone or linked implementations of logging buffer 225 may be presented for visual examination and interactive scrutiny. The data stored in the one or more implementations of logging buffer 225 may include myriad of combinations of an instruction for a component to enter into execution, a corresponding stack trace, a return address, a callback method, the time that an instruction is passed to the respective component, the name of the respective component, an instruction for the component to exit from execution, etc. Further, the data may be presented in such a manner that denotes the time at which data corresponding to a respective component is detected and/or stored by tracing service 220 or pushed on a corresponding stack. Such notation may be made by, e.g., charting the data against a time line or by affixing a time stamp to respective ones of the data fields.

Interface 500 may include times T1, T2, T3, and T4 along time axis 505; and further includes fields and sub-fields for displaying, relative to an appropriate time, data stored in the one or more linked implementations of logging buffer 225. The fields for the displaying the data may be annotated along axis 510. Example interface 500 shows horizontal time axis 505 displayed orthogonally to axis 510, but this implementation is provided only as an example. Alternative implementations may vary the orientation of the axis or eliminate one or more of the axis altogether. An example of such an implementation may include a listing of data detected by write buffer 215 or tracing service 220, stored in logging buffer 225, or alternatively pushed onto a corresponding stack, with a time stamp affixed to corresponding data.

Interface 500 may show components A, B, C, and D listed vertically. Thus, data corresponding to the respective components may be displayed in the sub-field that corresponds to the time at which the respective data was detected by write buffer 215 or tracing service 220, stored in logging buffer 225, or alternatively pushed onto a corresponding stack. Such components may be displayed as a result of a user-entered search criteria or, alternatively, as at least a part of default search criteria to be displayed.

Magnified sub-field 515 illustrates that user interaction with one or more displayed sub-fields of interface 500 may reveal further details regarding the data illustrated in a respective one of the sub-fields. Such further details may include data related to source code that is received as part of the, e.g., stack trace from component C, as shown by example interface 500.

Such further details may alternatively include a cascading view of the data in sub-field 515, whereby the cascading view is based upon, e.g., architectural hierarchy or search criteria. That is, in response to, e.g., a crash, a user command, query, or implementation of a debugger, magnified sub-field 515 may illustrate an upward and/or downward cascade of constructs for the data in sub-field 515. For example, in response to such a command or query to show details regarding threads running on component C, magnified sub-field 515 may further reveal details regarding one or more classes, methods, and further threads pertaining to component C.

Figure 6:
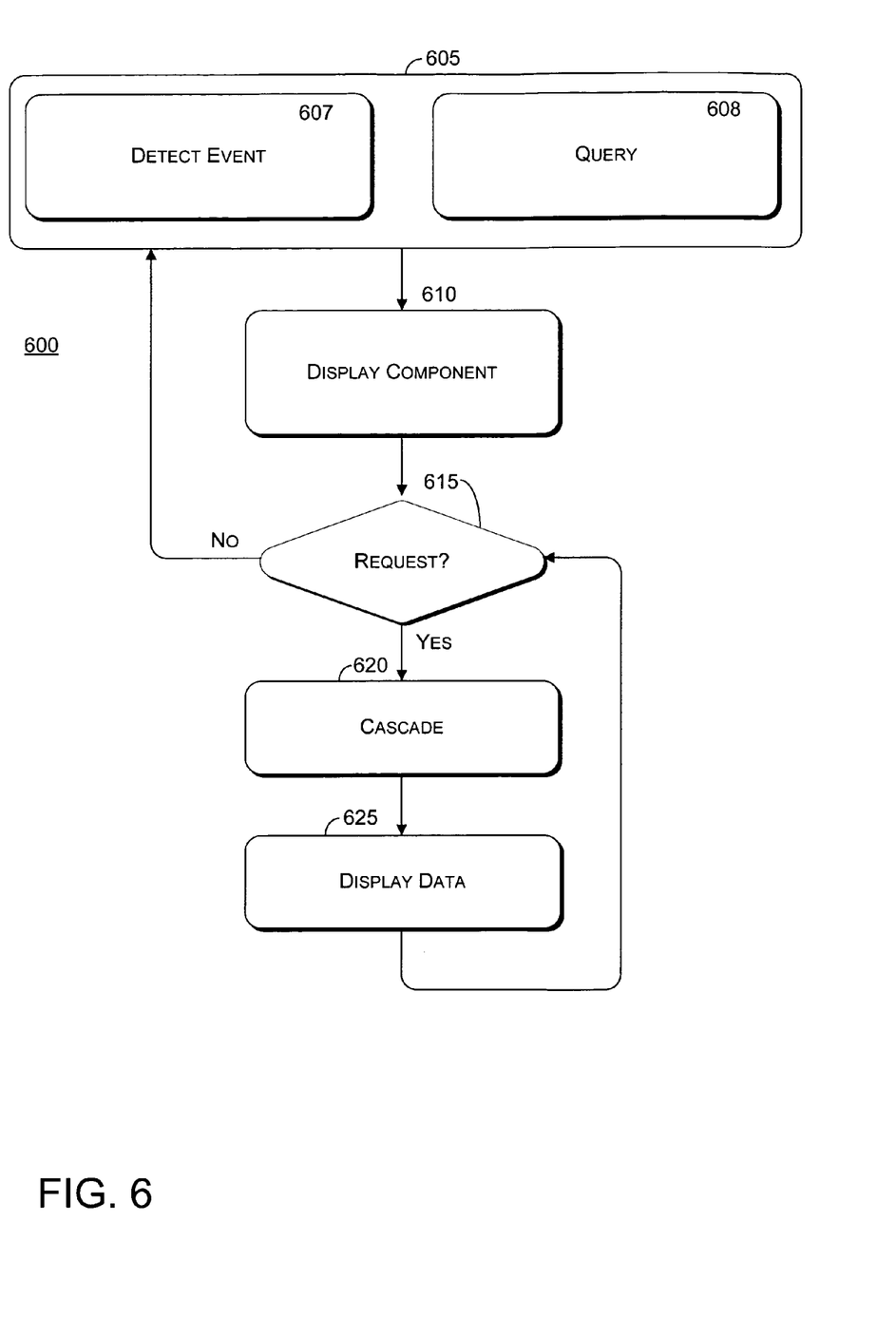
FIG. 6 shows an example processing flow for implementing active execution tracing visualization.

FIG. 6 shows example processing flow 600 for at least one implementation of active execution tracing visualization. FIG. 6 may be described below to describe a user's manipulative interaction with example interface 500 of FIG. 5, although such implementation is provided as an example only and is not intended to be limiting in any manner.

Block 605 may refer to an occurrence that may prompt interface 500 to appear to a user of one of processing devices 105, 110, and 115 (see FIG. 1), and display data garnered by tracing service 220 (see FIG. 2); that is, display various combinations of data buffered by logging buffer 225.

Detect event 607 may constitute an occurrence of block 605. More particularly, detect event 607 may refer to tracing service 220, or an associated component thereof, detecting an event that may be associated with the processing or execution of an application, program, or portion thereof (e.g., component A 205 or component B 210 (see FIG. 2)). A non-limiting example of such a detected event may be a crash (i.e., abnormal end) of an application, program, or portion thereof.

Query 608 may alternatively constitute an occurrence at block 605. More particularly, query 608 may refer to tracing service 220 receiving a user command or an automated query from, e.g., a debugger, to inquire about the processing status of an application, program, or particular component thereof.

The aforementioned command and query may be made via interface 500, although such implementation is not an exclusive example.

Block 610 may refer to, in response to the occurrence detected at block 605, interface 500 displaying data pertaining to the processing of an application, program, or component thereof. Interface 500, as shown and described in relation to FIG. 5, provides a non-limiting example of such display.

Decision 615 may refer to a determination by interface 500 of whether a user command or automated query has been received for the display of further data pertaining to the application, program, or particular component thereof displayed at block 610. Depending on the depth of the data displayed at block 610, the command or request determined to be received at decision 615 may be for myriad of combinations of: e.g., an instruction, or at least a data representation thereof, for a component to enter into execution; a corresponding stack trace; a return address; a callback method; the time that an instruction is passed to the respective component; the name of the respective component; an instruction for the component to exit from execution; etc. Further, the command or request determined to be received at decision 615 may seek details regarding one or more classes, methods, and further threads pertaining to the data for the application, program, or particular component thereof displayed at block 610.

Negative decision 615 may result in the data for the application, program, or particular component thereof displayed at block 610 remaining unchanged, and processing flow 600 returning to block 605. Alternatively negative decision 615 may result in the termination of processing flow 600 for active execution visualization.

Block 620, subsequent to positive decision 615 may result in at least one of an ascending and descending cascade-ordering of the further data requested as detected at decision 615. For example, at block 620, interface 500 may cause components that follow and/or precede a specified component as revealed by a stack trace to be ordered hierarchically or cause an ascending or descending organization of classes, methods, and threads, beginning with the requested element thereof. The organization may be based upon, e.g., architectural structure or search criteria. Furthermore, both constructs of such organization as well as sub-constructs of such organization may be ordered topologically based on their dependencies within a respective call stack. These examples of cascade ordering of data are provided as examples only, and are not intended to be limiting in any manner.

Block 620 may refer to interface 500 displaying the data organized at block 620 in at least one of ascending and descending order. Non-limiting examples of display implementations for displaying the data organized at block 620 include additional hierarchically ordered sub-fields on interface 500 or cascading data fields that hover above a field or sub-field of interface 500 that is activated by a user using a cursor.

Subsequent to block 625, processing flow 600 may revert back to decision 615.

By the above description, tools, implementations, and interfaces used to capture, study, and analyze events leading to a point-of-failure during execution of a function or at least a portion of an application, program, process, or other assemblage of programmable and executable code has been provided.

It is to be understood that the computer environment for any of the examples and implementations described above may include a computing device having, for example, one or more processors or processing units, a system memory, and a system bus to couple various system components.

The computing device may include a variety of computer readable media, including both volatile and non-volatile media, removable and non-removable media. The system memory may include computer readable media in the form of volatile memory, such as random access memory (RAM); and/or non-volatile memory, such as read only memory (ROM) or flash RAM. It is appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Reference has been made throughout this specification to "an example," "alternative examples," "at least one example," "an implementation," or "an example implementation" meaning that a particular described feature, structure, or characteristic is included in at least one implementation of the present invention. Thus, usage of such phrases may refer to more than just one implementation. Furthermore, the described features, structures, or characteristics may be combined in any suitable manner in one or more implementations.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example implementations and applications of the present invention have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the invention, as both described above and claimed below.

We claim:

1. A method, comprising:
   detecting a call to execute a function within an application;
   determining whether the function is to be traced by a tracing service;
   when the function is to be traced by the tracing service, receiving a pointer to a logging buffer associated with the tracing service;
   writing at least one frame of a call stack for the called function from a write buffer into the logging buffer;
   determining whether a user command or an automated query to determine a processing status of the called function is received prior to receiving a call to end execution of the called function,
   when the user command or the automated query to determine the processing status is received prior to receiving the call to end execution, committing the at least one frame of the call stack from the logging buffer to a persistent storage; and
   when the call to end execution is received prior to receiving the user command or the automated query to determine the processing status, permitting the at least one frame of the call stack in the logging buffer to be overwritten without committing the at least one frame of the call stack to the persistent storage.

2. A method according to claim 1, wherein the at least one frame of the call stack includes a time of the call to execute the function and at least one of a return address and a callback method associated with the function.

3. A method according to claim 1, wherein the writing the at least one frame of the call stack includes writing a name of a called module into the logging buffer.

4. A method according to claim 1, wherein the logging buffer stores the at least one frame of the call stack for functions corresponding to plural applications.

5. A method according to claim 1, wherein the logging buffer is linked to another buffer that stores at least one other frame of a call stack for another function corresponding to another application.

6. A method according to claim 1, wherein the logging buffer is linked to another buffer that stores information corresponding to another function.

7. A method according to claim 1, wherein the at least one frame of the call stack in the logging buffer is overwritten with at least one frame of another call stack when the call to end execution is received prior to receiving the user command or the automated query.

8. A method according to claim 1, wherein the at least one frame of the call stack is committed to the persistent storage in the event of a crash of the application.

9. A system, comprising:
   a write buffer configured to request a logging buffer pointer for a component corresponding to an application;
   a logging buffer configured to receive at least one frame of a call stack from the component via the write buffer, wherein the logging buffer pointer points to the logging buffer;
   a tracing service configured to determine whether a user command or an automated query to determine a processing status of the component is received prior to a call to exit execution of the component; and
   a persistent storage configured to record the at least one frame of the call stack when the user command or the automated query to determine the processing status is received prior to receiving the call to exit execution of the component,
   wherein the logging buffer is further configured to overwrite the at least one frame of the call stack when the call to exit execution of the component is received prior to receiving the user command or the automated query.

10. A system according to claim 9, wherein the write buffer is configured to request the logging buffer pointer by requesting verification from the tracing service, and the logging buffer corresponds to the tracing service.

11. A system according to claim 9, wherein the component corresponding to the application includes a function.

12. A system according to claim 9, wherein the component corresponding to the application includes a process, and wherein the logging buffer is linked to another logging buffer receiving at least one other frame of another call stack from another process.

13. A system according to claim 9, wherein the logging buffer is further configured to receive at least one other frame of another call stack from another component corresponding to another application.

14. A system according to claim 9, wherein the at least one frame of the call stack includes a time of call and at least one of a return address and a callback method.

15. A system according to claim 9, wherein the persistent storage is configured to record the at least one frame of the call stack upon occurrence of an abnormal end to execution of the application.

16. One or more computer-readable storage media comprising computer-readable instructions that, when executed, perform operations comprising:

sending a pointer to a logging buffer to an external write buffer associated with execution of an application component;

buffering at least one frame of a call stack received from the write buffer into the logging buffer;

determining whether a call to exit the execution of the application component is received prior to receiving a user command or automated query to determine a processing status of the application component;

committing the at least the one frame of the call stack from the logging buffer to a persistent storage provided the user command or the automated query to determine the processing status is received prior to receiving the call to exit the execution; and overwriting at least one item of buffered data in the logging buffer without committing the item to the persistent storage, provided the call to exit the execution of the application component is received prior to receiving the user command or the automated query to determine the processing status.

* * * * *